United States Patent Office 2,697,089
Patented Dec. 14, 1954

2,697,089

MONOHEXACHLOROBICYCLOHEPTENYL SILANES AND SILOXANE

Morton Kleiman, Chicago, Ill., assignor to Arvey Corporation, a corporation of Illinois No Drawing. Application March 16, 1953, Serial No. 342,742

5 Claims. (Cl. 260—46.5)

This invention relates to new silane compositions of matter which are useful in the production of new silicone polymers and elastomers. More specifically, this invention relates to [hexachlorobicyclo-(2.2.1)-2-heptenyl-5]-silanes and to the various polymeric and elastomeric products which arise from its hydrolysis and condensation with itself or other halo or alkoxy silanes.

Thus, the present invention relates to a silane having the following structure:

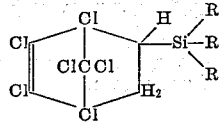

I wherein R is chlorine or an alkoxy group containing up to 5 carbon atoms. When R is chlorine, the product is termed [1,2,3,4,7,7-hexachlorobicyclo-(2.2.1)-2-heptenyl-5]-trichlorosilane. When R is an alkoxy group, such as methoxy, then the product is termed [1,2,3,4,7,7-hexachlorobicyclo - (2.2.1) - 2 - heptenyl - 5] - trimethoxysilane.

The silanes comprehended by the present invention can be polymerized to form valuable products merely by treatment thereof with water. The polymerization reaction involves hydrolyzing the R in the compound represented by the above structure to form intermediates which is turn spontaneously polymerize by condensation. In general, the trichlorosilane compound is more reactive to water than are the alkoxy silanes. It is thus sometimes advantageous to use it in the preparation of a polymer. However, when using trichlorosilane a side product, HCl, is formed which is highly corrosive to ordinary metallic equipment. Thus, it may at times be advantageous to utilize a trialkoxysilane as the monomer for, though it reacts more slowly, the side product produced is an alcohol which is readily handled in ordinary equipment. The alkoxysilanes may also be beneficially utilized in the production of semicured polymers as hereinafter discussed. In general, the polymers prepared from the trichloro material and the trialkoxy material are the same.

There are certain difficulties in the preparation of silicones or siloxane polymers having properties suitable for commercial exploitation arising from the extremes of physical properties imparted to the polymers by the organic group attached to the silicon atom. More particularly, those groups which are aliphatic generally give rise to soft and sticky polymers, while those which are aromatic generally produce a polymer that is in many cases hard, brittle, and possessed of internal strain.

The present invention discloses a new group of silanes in which the organic substituent is eminently suitable for preparing siloxane polymers whose properties are intermediate between aromatic and aliphatic substituted siloxanes. The substituent is a halogenated bicyclic aliphatic hydrocarbon which has some of the characteristics of an aromatic substituent, which result from the 6-membered ring structure present, and also some desirable aliphatic properties inherent in the nonaromatic bonding of the carbon atoms in the ring. The properties of the resin thus produced are further improved by the introduction of halogen onto the carbon atoms of the organic substituent which enhance solvent resistance, heat resistance, and flame proofing properties.

Another very important and practical economic advantage of the present invention is the very material reduction in cost of the present monomer as compared with other silane monomers. For example, vinyl trichlorosilane sells for about $2 per pound, varying somewhat depending on quantities purchased. Vinyl trichloro-silane is used as such in the preparation of siloxane polymers, and such polymers, in view of the cost of the monomer, are quite expensive. The polymer is of even greater cost in view of the fact that the process of polymerization which involves hydrolysis and condensation removes three chlorine atoms from the monomeric molecule, which are only partially replaced by oxygen atoms having an atomic weight less than one-half that of chlorine. Assuming conservatively that about half the weight of chlorine is lost, then only about 65% by weight of the monomer is recoverable as polymer. Thus 100 pounds of monomer can produce only about 65 pounds of polymer.

On the other hand, the monomer of the present invention, when prepared, for example, from vinyl trichloro-silane and hexachlorocyclopentadiene, is greatly reduced in cost per pound since hexachlorocyclopentadiene represents about 60% by weight of the monomer, and hexachlorocyclopentadiene costs less than about one-fourth the cost of vinyl trichloro-silane. The cost of this monomer of the present invention, based on raw material costs, is therefore decreased by about fifty per cent. Further, in the polymerization process, the loss of about half of the weight of the three chlorine atoms attached to the silicon atom in the present monomer represents only about twelve per cent of the weight of the monomer. From 100 pounds of monomer of the present invention more than about 85 pounds of polymer can be obtained. This is to be compared with vinyl trichloro-silane wherein only about 65 pounds of polymer is obtainable per 100 pounds of monomer. The vinyl alkoxy silanes are, if anything, more expensive than vinyl trichloro-silanes, and thus if they are used an even greater saving results.

Thus the present type of monomer is not only substantially less expensive, but its use results in higher yields.

Another advantage of the monomeric products of the present invention is their relative lack of hazard from the standpoint of flammability and toxicity as compared with other silane monomers, such as vinyl trichloro-silane. Vinyl trichloro-silane, having a relatively high vapor pressure, and being quite toxic, represents a hazard, and when working with it, adequate ventilation must be provided and vaporproof goggles must be worn. The vapors cause eye injury which may not be apparent until several hours after contact. In view of its low flash point, a fire hazard exists with its use and precautions must be exercised to prevent ignition. The products of the present invention, on the other hand, have a molecular weight more than 2½ times that of vinyl trichloro-silane and consequently have a very low vapor pressure. Therefore, possible toxic effects due to vapors are minimized. Further, the present product contains a very high percentage of chlorine, which fact, coupled with the lowered vapor pressure, renders any fire hazard negligible.

The products of the present invention may be prepared by reacting a vinyl trialkoxy silane or vinyl trichloro silane having the structure

II.

where R is as previously defined, with hexachlorocyclopentadiene to form the Diels-Alder adduct of said reactants. This product can then be treated with water to form the new polymer of improved characteristics.

The following equations illustrate the preparation of the monomers herein concerned and the method of deriving polymers therefrom:

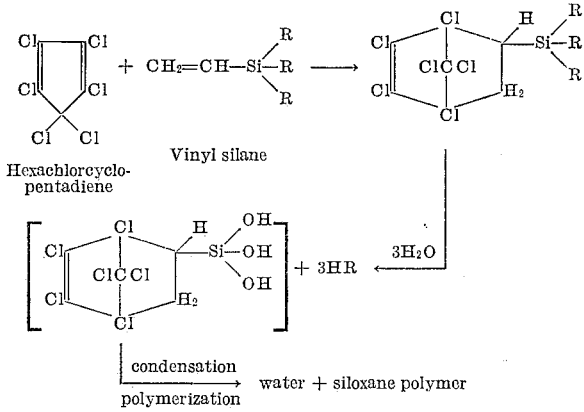

Examples I and II illustrate the preparation of a trialkoxy silane and a trichloro-silane, respectively.

EXAMPLE I

*Preparation of [1,2,3,4,7,7-hexachlorobicyclo-(2.2.1)-2-heptenyl-5]-triethoxy silane*

Hexachlorocyclopentadiene (0.2 mole, 54.6 grams) was heated to 160° C. in a three-necked flask equipped with a stirrer, thermometer, reflux condenser, and dropping funnel. Vinyl triethoxy silane (0.2 mole; 38 grams) was introduced through the dropping funnel in a dropwise manner while maintaining the aforementioned temperature. When the addition was complete the mixture was heated to 180° C. and maintained in the range of 180–190° C. for five hours. The reaction mixture was then cooled to room temperature and fractionated by distillation in vacuo. The fraction which boiled at 137° C. (0.1 mm. Hg pressure absolute) was removed and analyzed.

Calculated for
$C_{13}H_{18}Cl_6O_3Si$ ____ C. 33.72%; H, 3.92%; Cl, 45.94%
Found in product____ C, 33.61%; H, 3.99%; Cl, 46.17%

In the foregoing example the product prepared has the structure shown as Formula I wherein R is an ethoxy group. The reactant in this example is vinyl triethoxy silane having the structure shown as Formula II wherein R is again an ethoxy group. As previously stated, R may be an alkoxy group possessing from 1 to 5 carbon atoms such as propoxy, both normal and iso, methoxy, n-butoxy, iso-butoxy, sec-butoxy, tert-butoxy, n-pentoxy, sec-pentoxy, tert-pentoxy, etc.

EXAMPLE II

*Preparation of [1,2,3,4,7,7-hexachlorobicyclo-(2.2.1)-2-heptenyl-5]-trichlorosilane*

Hexachlorocyclopentadiene (0.4 mol; 109.2 grams) was heated to 190–200° C. in a three-necked flask equipped with a reflux condenser, stirrer, thermometer, and dropping funnel. Vinyl trichlorosilane (0.4 mol; 64.4 grams) was introduced dropwise over a 7½ hour period while maintaining the above temperature. When the addition was complete the reaction vessel was allowed to cool to room temperature. The reaction mixture was then fractionally distilled in vacuo and the fraction boiling at 126° C./0.07 mm. weighing 135.5 grams was removed.

A portion of the above material was analyzed with the following results.

Analysis:

| | C | H | Cl |
|---|---|---|---|
| | Percent | Percent | Percent |
| Calculated for $C_7H_3Cl_9Si$ | 19.33 | 0.09 | 73.53 |
| Found for Product | 19.54 | 0.73 | 73.53 |

Trialkoxy silanes such as, for example, the product of Example I, can also be prepared from the trichloro product of Example II by treating said trichloro product with absolute ethanol.

The silanes of the present invention may be prepared by adding either reactant to the other in a portionwise manner while maintaining the reaction temperature between about 75° C. and about 250° C.

The reaction can be readily accomplished in the absence of any additional solvent. However, a mutual, inert solvent such as hydrocarbon solvent or halogenated solvent may be used. The use of solvent for the reaction may be desired if the reaction is to be carried out under reflux conditions.

The rate of reaction is directly dependent on the temperature and the time required for completion of the reaction varies inversely therewith. Generally the reaction is completed within one-half to eight hours. However, a lesser time will only result in the recovery of some unreacted starting material. Conversely, longer reaction times are also suitable.

The monomeric silanes of the present invention can be used to prepare linear or cross-linked siloxane polymers, depending on the degree of hydrolysis of said monomers.

Limiting the degree of hydrolysis by limiting the amount of water utilized so as to hydrolyze only two R groups in the monomer, results in the formation of linear polymers, as illustrated below:

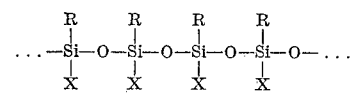

wherein R is as previously defined and X is the 1,2,3,4,7,7-hexachlorobicyclo-[2.2.1]-2-heptenyl-5 radical.

By further hydrolysis of the linear polymer, above indicated, or by complete hydrolysis of the monomer, a cross-linked siloxane polymer can be prepared which might be illustrated as follows:

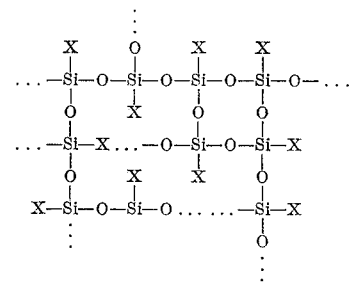

wherein X is the radical above named.

The compounds of this invention can be polymerized in the same manner as are other chloro or alkoxy silanes. Such polymerization, induced by water, may be carried out in the presence or absence of solvent, with or without heating and with varying amounts of water. The polymerization process utilizing the monomers herein disclosed is the same regardless of whether the R in said monomers is chlorine or an alkoxyl radical. In addition to homopolymerizing the monomers herein disclosed, they may also be copolymerized with other silanes, thereby modifying the properties of the resultant products. For example, [1,2,3,4,7,7-hexachlorobicyclo-(2.2.1)-2-heptenyl-5]-triethoxy silane can be copolymerized with dimethyl silane diol to achieve a product which might be partially illustrated as follows:

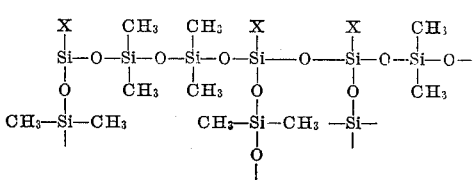

The polymers herein disclosed are useful as ingredients in fireproofing agents, heat-stable coating compositions, water repellent compositions, impregnants for laminations, hydraulic fluids, low temperature lubricants, and have many other uses wherein inertness to broad temperature change is desirable or required.

A specific process of polymerization utilizing [1,2,3,4,7,7 - hexachlorobicyclo - (2.2.1) - 2 - heptenyl - 5] - trichlorosilane is illustrated in Example III.

EXAMPLE III

*Polymerization of [1,2,3,4,7,7-hexachlorobicyclo-(2.2.1)-2-heptenyl-5]-trichlorosilane*

To ten grams of [1,2,3,4,7,7-hexachlorobicyclo-(2.2.1)-2-heptenyl-5-trichlorosilane was added a molar excess of water. The mixture became murky and a white solid precipitated. The product was a flaky granular white polymer.

I claim as my invention:

1. As a new composition of matter a compound having the structure

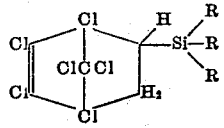

wherein R is of the group consisting of chlorine and alkoxy radical containing from one to five carbon atoms.

2. The compound of claim 1 wherein R is chlorine.

3. As a new composition of matter the condensation polymer of the hydrolyzed product of the composition of claim 1.

4. As a new composition of matter the condensation polymer of [1,2,3,4,7,7-hexachlorobicyclo-(2.2.1)-2-heptenyl-5]-silane triol.

5. As a new composition of matter a siloxane copolymer containing as a copolymerized repeating structural unit the unit $RSiO_{3/2}$ where R is the radical 1,2,3,4,7,7-hexachlorobicyclo-[2.2.1]-2-heptenyl-5.

No references cited.